United States Patent [19]

Johnston

[11] 4,409,713
[45] Oct. 18, 1983

[54] ELECTRICAL CONNECTOR APPLICATION TOOL

[75] Inventor: James J. Johnston, Old Saybrook, Conn.

[73] Assignee: Akzona Incorporated, Asheville, N.C.

[21] Appl. No.: 188,557

[22] Filed: Sep. 18, 1980

[51] Int. Cl.³ ............................ B25F 1/00; H02G 1/14
[52] U.S. Cl. ..................................... 29/33 M; 7/107; 30/90.1; 81/9.5 R; 29/566.4
[58] Field of Search ..................... 7/107; 30/90.1; 81/9.5 C, 9.5 R; 29/566.4, 566.1, 564.4, 750, 751, 758, 759, 760, 749, 33 M; 269/903; 339/45 M, 75 M, 40, 91 R

[56] References Cited

U.S. PATENT DOCUMENTS

| 698,567 | 4/1902 | Sibley | 81/9.5 C |
|---|---|---|---|
| 2,163,716 | 6/1939 | Turner | 29/749 |
| 2,897,033 | 7/1959 | Ford | 339/45 M |
| 2,984,905 | 5/1961 | Harmon | 30/90.1 |
| 3,035,243 | 5/1962 | Bowling | 339/65 |
| 3,177,567 | 4/1965 | Gehrman | 29/750 |
| 3,267,565 | 8/1966 | Stuhler | 339/45 M |
| 3,444,607 | 5/1969 | Peterson et al. | 29/566.1 |
| 3,620,104 | 11/1971 | Horrocks | 30/90.1 |
| 3,926,497 | 12/1975 | Eigenbrode | 339/91 R |
| 4,070,754 | 1/1978 | Bauerkemper | 29/268 |

FOREIGN PATENT DOCUMENTS 1004445  2/1977  Canada ........................ 81/9.5 R Primary Examiner—Lowell A. Larson
Attorney, Agent, or Firm—McCormick, Paulding & Huber

[57] ABSTRACT

A tool for terminating an electrical cable by applying to the cable a connector assembly which includes a housing and an insert received in snap-in assembly within the housing. The insert maintains bare end portions of individually insulated conductors which comprise the cable in electrically contacting engagement with spring contacts within the housing and retains the cable in assembled relation to the connector assembly. The tool has an elongated body with wire insulation strippers at opposite ends thereof for preparing an end portion of a cable. A recess in the body intermediate the wire strippers receives a partially assembled connector assembly and facilitates movement of the insert thereof into snap-in engagement with the connector assembly using a screw driver or the like in conjunction with the tool to apply prying force to the partially assembled connector assembly.

15 Claims, 17 Drawing Figures

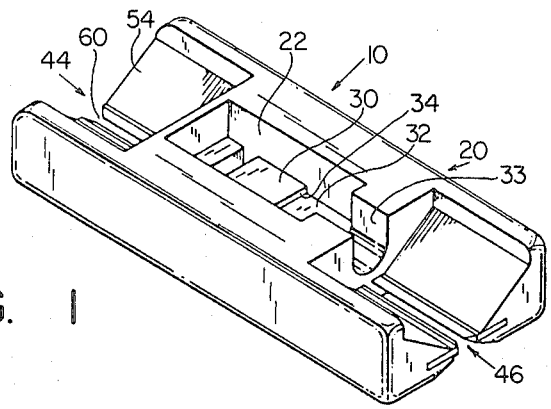
FIG. 1
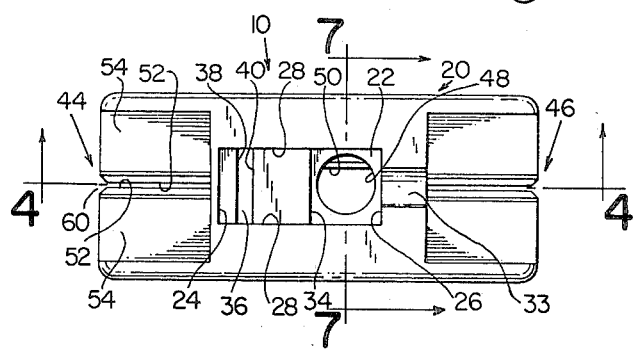
FIG. 2
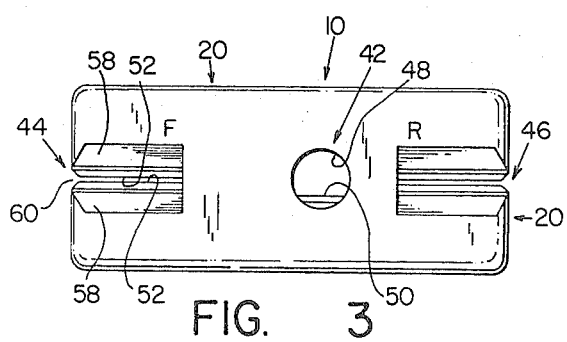
FIG. 3
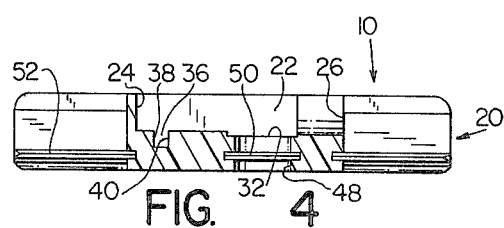
FIG. 4
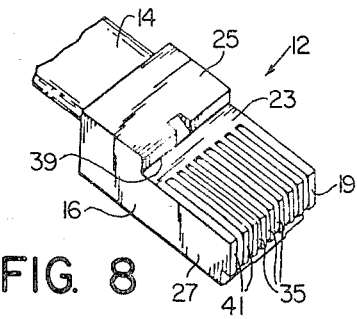
FIG. 8
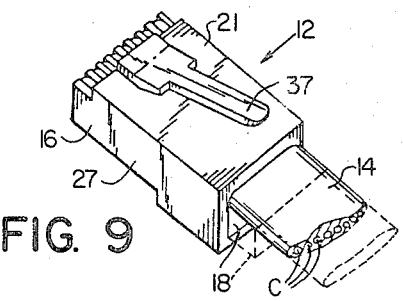
FIG. 9
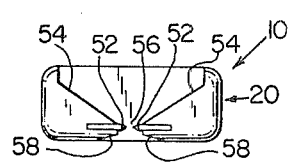
FIG. 5
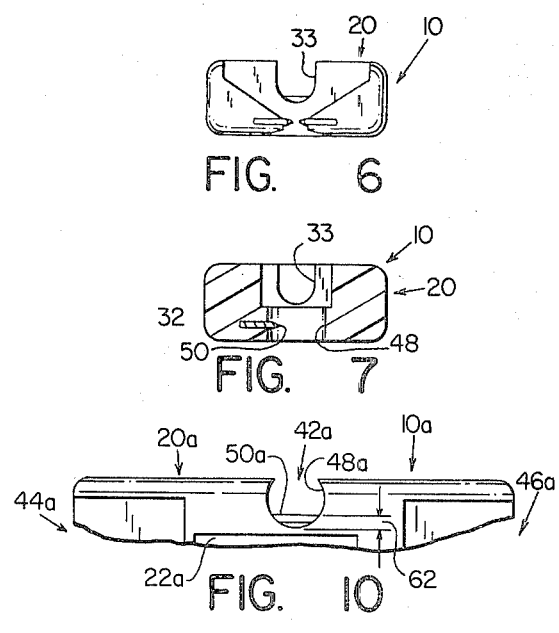
FIG. 6
FIG. 7
FIG. 10

ELECTRICAL CONNECTOR APPLICATION TOOL

BACKGROUND OF THE INVENTION

This invention relates in general to tools of the type used to terminate electrical cables and deals more particularly with an improved portable hand tool for applying to a terminal end of an electrical cable a connector assembly which includes a housing and an insert assembled in snap-in engagement with the housing. The tool of the present invention is particularly adapted for applying a modular plug type connector assembly to terminate a cable which contains a plurality of individual solid wire conductors. Bare end portions of the conductors are rigidly supported in slots in a connector assembly insert which is assembled within an associated housing. The insert cooperates with the housing to bias the bare end portions into electrically contacting engagement with associated spring contacts within the housing. Cables terminated in the aforedescribed manner are particularly suitable for use in electrical distribution systems, in the telecommunication industry, for example. In the installation and repair of such distribution systems cable termination in the field is required. It is the general aim of the present invention to provide an improved durable lightweight portable hand tool for use in the field termination of such cable with connector assemblies such as aforedescribed. It is a further aim of the invention to provide an expendable tool of the aforedescribed general type for low cost manufacture.

SUMMARY OF THE INVENTION

In accordance with the invention, an improved tool is provided for applying to a terminal end of an electrical cable a connector assembly which includes a housing and an insert received within the housing. When the connector assembly and cable are in a partially assembled condition, the insert projects rearwardly from the connector assembly housing. The connector assembly includes means for securing the insert within the housing in response to movement of the insert further into the housing from a partially assembled position. The tool comprises a tool body which includes restraining means for receiving a partially assembled connector assembly and restraining it for movement in at least a rearward direction relative to the tool body. A first abutment surface on the tool body and in the part of rearward movement of the connector assembly is engageable with a rear wall of the insert. The tool further includes a first fulcrum means on the tool body spaced forwardly of the first abutment means a distance greater than the overall length of the partially assembled connector assembly, as measured from front to rear, for supporting a prying element in a first position. The prying element is used in conjunction with the tool to apply prying force to move the housing rearwardly relative to the tool body whereby to forceably move the insert into the housing.

BRIEF DESCRIPTION OF THE DRAWINGS

FIG. 1 is a perspective view of a connector assembly application tool embodying the present invention.

FIG. 2 is a top view of the tool of FIG. 1.

FIG. 3 is a bottom view of the tool of FIG. 1.

FIG. 4 is a sectional view taken along the line 4—4 of FIG. 2.

FIG. 5 is a left end elevational view of the tool as it appears oriented in FIG. 2.

FIG. 6 is a right end elevational view of the tool as it appears oriented in FIG. 2.

FIG. 7 is a sectional view taken along the line 7—7 of FIG. 2.

FIG. 8 is a perspective view showing the bottom and front of a typical connector assembly terminating a flat cable.

FIG. 9 is a perspective view of the connector assembly and cable of FIG. 8, but show the top and rear of the connector assembly.

FIG. 10 is a fragmentary top view of another connector assembly application tool embodying the invention.

DETAILED DESCRIPTION OF PREFERRED EMBODIMENT

Figure 16:
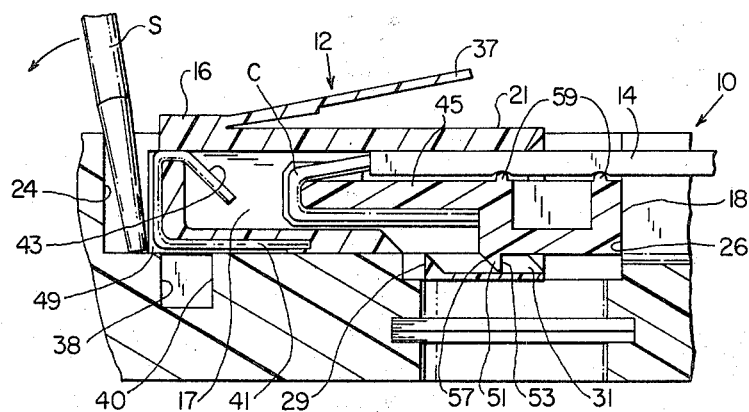
FIG. 16 is a somewhat enlarged sectional view similar to FIG. 4 but illustrates the manner in which the tool used to complete assembly of a partially assembled electrical connector assembly.
Figure 17:
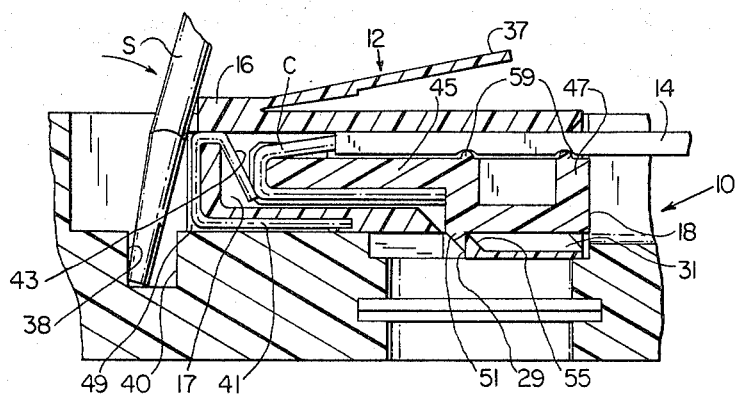
FIG. 17 is similar to FIG. 16 but shows the connector assembly in another position relative to the tool.

Turning now to the drawings and referring first particularly to FIGS. 1-7, an electrical connector application tool embodying the present invention is indicated generally by the reference numeral 10. The tool 10 is particularly adapted for applying to an electrical cable an electrical connector assembly which includes a housing and an insert which is received in snap-in engagement with the housing and which cooperates with the housing to retain the electrical cable in attached electrically conducting relation to the connector assembly. A typical connector assembly, illustrated in FIGS. 8 and 9 and indicated generally by the reference numeral 12, is shown connected to the terminal end of an electrical cable 14 which may, for example, comprise a circuit distribution cable for a telephone system or the like. The illustrated connector assembly 12 is an eight position modular plug type connector and includes a housing 16 and an insert 18, shown in FIG. 9, which is received within a cavity 17 in the housing, as best shown in FIGS. 16 and 17. A partially assembled position of the insert 18 relative to the housing 16 is indicated in broken lines in FIG. 9.

Referring to FIGS. 8, 9, 16 and 17, the housing 16 is made from a dielectric plastic material, is generally rectangular, and as oriented in FIGS. 9, 16 and 17 has a vertically disposed front wall 19, a top wall 21, a stepped bottom wall which includes a front portion 23 and a rear portion 25 vertically offset from the front portion, and a pair of substantially identical side walls 27, 27. The cavity 17 is defined by the inner surfaces of the front, top, bottom and side walls of the housing 16.

An aperture formed in a central part of the rear portion 25 proximate the junction of the front and rear portions 23 and 25 defines a forwardly facing abutment surface 29. A longitudinally extending upwardly and rearwardly opening slot 31 formed in a central part of the rear portion 25 terminates at its forward end in an upwardly and forwardly inclined cam surface 55. The upper end of the cam surface 55 terminates at the upper edge of the abutment surface 29. The front portion 23 is separated from the rear portion 25 along a transverse line of separation indicated at 39 and best shown in FIG. 8. In the forward end of the housing there is formed a plurality of parallel slots 35, 35 which extend vertically across the front wall 19 and open forwardly therethrough. Contiguous portions of the slots 35, 35 extend for some distance through the bottom wall front portion 23 and open downwardly therethrough.

A resilient latch tab 37 connected to a housing 16 near its forward end by an integral hinge is normally biased to a position wherein it extends rearwardly and upwardly away from the top wall, as best shown in FIG. 9. The latch tab has latching surfaces which cooperate with latching surfaces on an associated plug receptacle (not shown) to releasably retain the connector assembly 12 in assembled relation with the receptacle in a manner well known in the telecommunication art.

Spring contacts or terminals 41, 41 are mounted at the forward end of the housing, substantially as shown in FIGS. 8, 16 and 17, each contact being mounted within an associated slot 35. The illustrated connector assembly 12 has 8 slots 35, 35, each slot containing an associated contact 41. Each contact 41 is formed from a piece of plated resilient phosphor bronze wire anchored in the housing 16 and has a resilient cantilever contact portion 43, disposed within the cavity 17 and normally forming a 45 degree angle with the top wall 21.

The insert 18 is made from dielectric plastic material and generally complements portions of the cavity 17 in which it is received. It includes a forward end portion 45, which has a generally rectangular cross section generally complementing the cross section of the forward end portion of the cavity 17, and a somewhat larger generally rectangular rear portion 47. A plurality of outwardly opening slots 49, 49 equal in number to the slots 35, 35 are formed in the front, top and bottom walls of the front portion and extend rearwardly for some distance within the slot portions in the bottom wall. The slots 49, 49 are arranged for registry with the contact portions 43, 43 when the insert 18 is positioned within the housing 16, as will be hereinafter further described.

An integral locking member 51 is formed centrally of the rear portion 25 adjacent its forward edge and extends below the lower surface of the rear portion substantially as shown in FIGS. 16 and 17. The locking member 51 has a rearwardly facing abutment surface 53 and a generally forwardly facing cam surface 57 which is inclined rearwardly and downwardly from the forward edge of the rear portion 47. A pair of longitudinally spaced apart cable retaining ribs 59, 59 project upwardly from the top of the rear portion 47 and extend transversely thereacross, as best shown in FIGS. 16 and 17.

The illustrated cable 14 is a substantially flat under carpet telephone cable and contains a plurality of insulated parallel solid electrical conductors C, C. Such conductive jacket dielectric cable is manufactured by Brand-Rex Company, Willimantic, Conn. and marketed under the trademark TELETAPE. Bare end portions of the individually insulated conductors C, C are rigidly supported in slots 49, 49 in the insert 18 and are maintained in biased engagement with associated spring contact portions 43, 43 within the housing 16 by the insert 18, as best shown in FIG. 17. The insert is retained in snap-in assembly with the housing, as will be hereinafter further discussed.

The tool of the present invention is used to prepare the terminal end portion of a cable for assembly with an insert and to assemble the insert-cable subassembly within a connector assembly housing with sufficient force to assure proper snap-in engagement of the insert with the housing whereby to establish effective electrical contact between the various conductors C, C and associated spring contacts within the housing and to retain the cable in assembly with the connector assembly.

The illustrated tool 10 has at least one wire stripper for preparing a cable, such as the cable 14, for termination by a connector assembly, such as the assembly 12 and further includes means to facilitate assembly of an eight-position modular connector, such as the connector 12, with sufficient force to assure proper connection to the cable using a readily available prying tool such as a screw driver or the like. For a more complete disclosure of electrical connector assemblies of the type which may be assembled using the tool 10 reference may be had to my copending U.S. patent application Ser. No. 144,830 for ELECTRICAL CONNECTOR ASSEMBLY, filed Apr. 29, 1980, now U.S. Pat. No. 4,373,766, issued Feb. 15, 1983, and assigned to the assignee of the present invention, which is hereby adopted by reference. Such connector assemblies are manufactured by Connector Technology Corporation, Wethersfield, Conn.

Considering the tool 10 in further detail and referring further to FIGS. 1-7, the illustrated tool has a generally rectangular body designated generally by the numeral 20 and is preferably molded from durable plastic material. A recess 22 formed in a central portion of the body 20 opens upwardly through the body top wall of the body for receiving a partially assembled connector assembly and restraining it to move in at least a rearward direction relative to the tool body 20, as will be hereinafter further discussed. The recess 22 is defined by a front wall 24, a rear wall 26, a pair of opposing side walls 28, 28 a stepped bottom wall, which includes a front portion 30 and a rear portion 32 at a somewhat lower elevation than the front portion, and a rearwardly facing wall 34 located at the junction of the front and rear portions 30 and 32. Another recess 36 formed in the body 20 opens upwardly through the bottom wall front portion 30 and extends transversely of the body between the side walls 28, 28, and is defined by a front wall 38 and a rear wall 40, as best shown in FIG. 4. An upwardly opening groove 33 formed in the body communicates with the rear end of the recess 22 for a purpose which will be hereinafter explained.

The illustrated tool 10 has three wire insulation strippers indicated generally at 42, 44 and 46. The wire stripper 42 is particularly adapted to strip the outer insulation jacket from a cable which has a round or circular cross section and comprises a cylindrical aperture 48 formed in the body 20 and opening through the lower surface of the body and the bottom wall portion 32, as best shown in FIGS. 4 and 7. A stainless steel blade 50 molded in the body has a rectilinear edge which is exposed within and extends across a portion of the cylindrical aperture 48, substantially as shown. The wire strippers 44 and 46, located at opposite ends of the body 20, are substantially identical structures which differ only in dimension, as will be hereinafter further discussed.

The wire insulation stripper 44 is typical and essentially comprises a pair of blades 52, 52 mounted in fixed position in the body 20 and having exposed parallel edges. More specifically, the forward end portion of the body 20 has a relatively deep upwardly opening recess defined by downwardly and inwardly inclined surfaces 54, 54 which terminate at a longitudinally extending slot 56 which opens through the forward end of the body. Another somewhat shallower recess is formed at the forward end of the body and opens downwardly and outwardly through the forward end. The latter recess is defined, in part by upwardly and inwardly inclined surfaces 58, 58 which terminate at the slot 56. The blades 52, 52 are preferably molded in fixed position within the body and have opposing parallel edges disposed within the slot 56, substantially as shown. The forward corners of the blades 52, 52 are chamfered to define an outwardly diverging throat 60 which opens through the forward end of the body 20.

The wire insulation stripper 44 is particularly adapted for stripping flat cable, such as the cable 14, size AWG No. 26 (0.015 max. diameter) and for this reason the letter "F" is imprinted on the body at the forward end to designate the flat cable stripper. The edges of the blades 52, 52 are spaced apart at least 0.018 inches so that the wire conductors which comprise the cable will not be seriously nicked by the hardened steel blades.

As previously noted the wire insulation stripper 46 is substantially structurally identical to the stripper 44 previously described. The stripper 46 is primarily adapted for stripping the conductors which comprise a round cable size AWG No. 24 (0.020 max. diameter) and for this reason the rear end portion of the tool is marked with the letter "R" to designate the stripper used to prepare "round" cable or cable of circular cross section. However, the stripper 46 may also be used to strip the outer insulation jacket from a flat cable, as will be hereinafter discussed. The edges of the blades which comprise the stripper 46 are spaced apart at least 0.023 inches to prevent damage to the conductors, as previously described.

Figure 11:
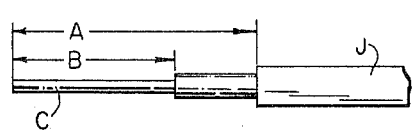
FIG. 11 is a fragmentary side elevational view of a flat cable from which insulation has been stripped using a tool embodying the invention.
Figure 13:
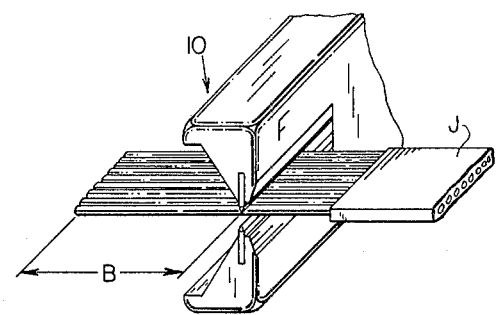
FIG. 13 is similar to FIG. 12 but further illustrates a manner in which the tool may be used to strip flat cable.
Figure 12:
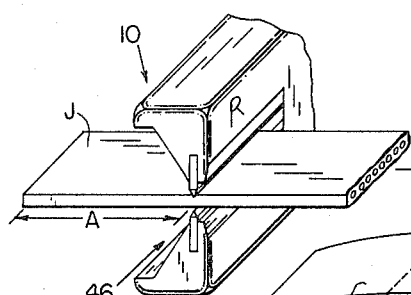
FIG. 12 is a fragmentary perspective view and illustrates a manner in which the tool may be used to strip insulation from flat cable.

In applying an eight-position modular connector assembly to a flat four pair conductive jacket dielectric cable (AWG No. 26) a multiple strip insulation configuration, as illustrated in FIG. 11 is preferred to eliminate risk of shorting. More specifically, it is generally desirable that the insulation on each of the bare conductor end portions extend beyond the outer insulation jacket, designated J, as best shown in FIG. 11 to facilitate attachment to a connector assembly with minimum risk of shorting. The flat cable 14 is first inserted into the stripper 46, marked "R" with an end portion of desired length "A" extending beyond the stripper blades as indicated at A in FIG. 12. A pulling force is next applied to the cable in the direction of the arrow in FIG. 12 to strip the outer cable sheath or jacket J leaving the insulation on the various individual conductors C, C in tact. The individual insulated conductors C, C are next inserted into the insulation stripping tool 46, marked "F", with the blades of the wire stripper incising the insulating on the individual conductors C, C a distance "B" from the free end of the cable. The cable is then pulled through the stripper to develop the bare conductor length "B" as shown in FIG. 11.

Figure 14:
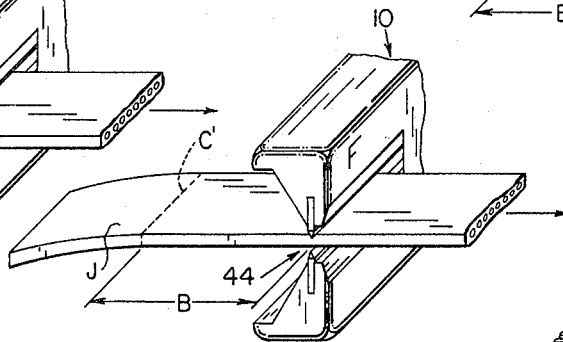
FIG. 14 is a fragmentary perspective view and illustrates another way in which the tool may be used to strip flat cable.

Alternatively, the cable 14 may be prepared by prestressing the free end portion of the cable outer jacket J, that is stretching it to a position somewhat beyond the free end portions of the associated insulated connectors C, C contained within, as shown in FIG. 14, wherein the location of the end portions of the conductors relative to the stretched cable jacket is indicated by the broken line C'. While this stretching force is maintained, the cable 14 is inserted into the insulation stripper 44, marked "F" whereby the blades 52, 52 cut throgh both the outer insulation jacket and the insulation on the various individual conductors C, C. Force is then applied to the cable to pull it through the tool and strip the free outer end portion of the insulation jacket and insulation from the end portions of the conductors C, C. Cutting the outer jacket with the stripping tool releases the stressing force on the jacket allowing the cut end portion of the jacket J to snap back to the position shown in FIG. 11 wherein the insulation on the various individual conductors extends some distance outwardly beyond the outer end portion of the jacket.

The cable end portion is next positioned adjacent the upper surface of the insert 18. The bare end portion of each conductor C is positioned within an associated slot 49 in the upper wall of the insert and bent downwardly into a portion of the slot 49 defined by the forward end of the insert. Thereafter, the extending bare end portion of each conductor is bent rearwardly and upwardly to a position wherein it lies within a portion of an associated slot defined by a lower part of the insert.

The insert 18 with the cable end portion positioned thereon is next inserted into the cavity 17 to a position of partial assembly. The partially assembled connector assembly 12 is now positioned within the tool cavity 22, substantially as shown in FIG. 16. The distance between the forwardly facing rear wall 26 and the rearwardly facing wall front 24 on the body 20 is substantially greater than the distance between the front surface of the housing 16 and the rear surface of the insert 18 of the partially assembled connector assembly 12, that is, the overall length of the partially assembled connector assembly 12, as measured from front to rear. Thus, when the partially assembled connector assembly 12 is positioned within the cavity 22 there is sufficient space between the forward end of the housing 16 and the wall 24 to permit insertion of a prying element, such as the screwdriver blade, shown in FIG. 16 and designated by the letter S. The front wall 24 provides a fulcrum for supporting the screwdriver S in a first position to move the connector assembly 12 rearwardly relative to the tool body 20 in response to prying force applied to the screwdriver S in the direction of the arrow in FIG. 16. The rear wall 26 provides an abutment to prevent rearward movement of the insert 18 whereby the housing 16 moves rearwardly relative to the insert in response to the applied prying force. The recess side walls 28, 28 cooperate with associated housing side walls 27, 27 to restrain the partially assembled connector assembly for movement in at least a rearward direction relative to the tool body 20.

The tool wall surface 38 which is spaced rearwardly of the wall surface 24 provides a second fulcrum which supports the screwdriver S in a second position whereby further prying force may be applied to the connector assembly 12 in the direction indicated in FIG. 17 to effect forceable engagement of the coengageable inclined cam surfaces 55 and 57. Further rearward movement of the housing 16 relative to the insert 18 causes the resilient rear portion 25 to be downwardly bowed whereby to allow the locking member 51 to travel past the cam surface 55. At this point the resilient portion 25 snaps from its bowed condition to its normal or undeformed position bringing the abutment surfaces 29 and 53 into substantial abutting engagement whereby the locking member 51 cooperates with the bottom wall of the housing 16 to retain the insert 18 and its associated cable end portion in a locked position within the housing 16. Upon completion of the assembly each of the conductors C is engaged with an associated spring contact portion 43 within the housing 16, substantially as shown in FIG. 17.

The tool 10 may also be used to apply a modified form of the connector assembly 12 (not shown) to a round cable, that is a cable having a circular cross section, and containing a plurality of individual solid conductors which are twisted relative to each other and about the axis of the cable.

Figure 15:
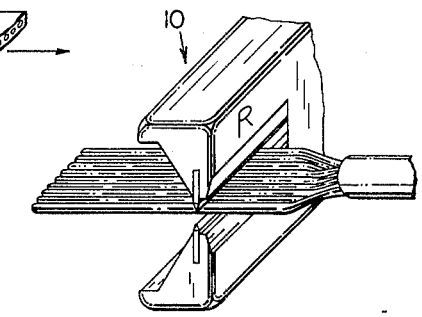
FIG. 15 is a fragmentary perspective view and illustrates a way in which the tool may be used to strip a cable which has a circular cross section.

In preparing a cable of the aforedescribed general type an end portion of outer insulation jacket is first removed by inserting the end portion of the cable into the cable stripper 42 through the aperture 48. The tool is then rotated about the axis of the cable with the blade 50 in cutting engagement with the cable jacket. After the jacket or sheath has been severed the cable is removed from the tool and the sheath stripping operation completed by bending the cable at right angles to the 360 degree cut section and thereafter removing the sheath by pulling it from the cable conductors. The nylon and manufacture identification strings in the cable may be cut by inserting them into the insulation stripper at either end of the tool and wiping them against the stripper blades. Removal of insulation from the various individual conductors may now be accomplished by spreading the conductors into and holding them in a substantially flat fan shaped pattern, in or out of color sequence as required by the given application. While the conductors are held in a flat pattern, that is with the various conductors in parallel adjacent relation the insulated conductors are inserted into the stripper 46, marked "R", as shown in FIG. 15, whereby the insulation is cut. Thereafter, the insulation is removed from the end portions of the wire conductors by pulling the cable through the stripper.

The conductor assembly is assembled with the round cable in the manner generally aforedescribed. The configuration of the connector housing and insert for use with round cable differs somewhat from the configuration of the housing 16 and insert 18, previously described. Reference may be had to Applicant's aforementioned pending application for disclosure of such a connector assembly. However, for complete understanding of the present tool it is sufficient to note that the groove 33 is provided in the tool to accommodate round cable on a partially assembled connector assembly when the connector assembly is positioned within the cavity 22. The procedure for completing the assembly of a connector assembly with a "round" cable using a prying element in conjunction with the tool 10 is substantially identical to the procedure previously described.

In FIG. 10 there is shown another tool embodying the invention and indicated generally by the reference numeral 10a. The tool 10a is similar in most respects to the tool 10 previously described and differs therefrom only in the location and arrangement of its round wire insulation stripper. More specifically, the tool 10a has a generally rectangular body 20a which has a recess 22a opening through its top wall. Wire insulation strippers 44a and 46a are located at opposite ends of the tool, substantially as aforedescribed. A wire stripper 42a which is particularly adapted for stripping the outer insulation jacket from a cable having a circular cross section, comprises a parti-cylindrical aperture 48a which extends vertically through the tool body 20a and opens through one side edge of the body, substantially as shown. A blade 50a, molded or otherwise secured in fixed position within the body 20a extends across a portion of the parti-cylindrical aperture 48a, substantially as shown. The edge of the blade 50a is spaced from the peripheral surface of the aperture 48a a distance substantially equal to the thickness of the cable jacket to be stripped, the latter distance being indicated by the numeral 62. The width of the side wall opening is preferably substantially less than the diameter of the aperture 48a. This arrangement allows easy access to the blade 50a through the side opening in the tool to facilitate convenient cutting of identification strings and the like while protecting the blade from accidental contact with other tools or hardened objects when the tool 10a is carried in a tool box or the like.

I claim:

1. An electrical connector application tool for applying an electrical connector assembly to an electrical cable, the connector assembly including having a cavity therein opening through its rear wall, insert means adapted to be received within the cavity for securing the connector assembly in connected relation to the cable, the insert means in partial assembly within the housing projecting rearwardly from the cavity and beyond the rear wall of the housing, and means for securing the insert means in the housing in response to movement of the insert means for its partially assembled forwardly into the cavity and to its fully assembled position, said tool comprising a tool body formed from a single piece of material and having first recess therein opening outwardly through its outer surface and at least partially defined by fixed spaced apart side and end walls, restraining means defined by side walls of said first recess for receiving a partially assembled connector assembly therebetween and restraining it to move in at least a rearward direction relative to the tool body, a first abutment defined by a forwardly facing wall of said first recess in the path of rearward movement of the partially assembled connector assembly relative to the tool body for engaging a rear wall of said insert means, first fulcrum means defined by a rearwardly facing wall of said first recess spaced forwardly of said first abutment a distance greater than the length of said partially assembled connector assembly as measured from the front wall of the housing to the rear wall of the insert means for supporting a prying element in a first position wherein an end portion of the prying element is inserted between said first fulcrum means and the forward end of the housing to move the housing rearwardly relative to the tool body in response to prying movement of the prying element whereby to force said insert means toward its position of assembly within said cavity, and second fulcrum means on said tool body spaced rearwardly of said first fulcrum means and located closer to said first fulcrum than to said first abutment means for supporting the prying element in a second position to move the housing rearwardly relative to the tool body in response to prying movement of the prying element.

2. An electrical connector application tool as set forth in claim 1 wherein said tool body has a second recess therein opening into said first recess and said second fulcrum is defined by a wall of said second recess.

3. An electrical connector application tool as set forth in claim 2 wherein said wall of said second recess comprises a rearwardly facing wall.

4. An electrical connector application tool as set forth in claim 1 werein said tool includes second abutment means on said tool body for cooperating with the housing to limit movement of the partially assembled connector assembly toward said first fulcrum means.

5. An electrical connector application tool as set forth in claim 4 wherein said second abutment means is defined by another rearwardly facing wall of said first recess.

6. An electrical connector application tool as set forth in claim 5 wherein said first recess has a bottom wall including a front portion at one level and a rear portion at another level and said other rearwardly facing wall is located at the junction between said front portion and said rear portion.

7. An electrical connector application tool as set forth in claim 1 including at least one wire insulation stripper disposed in fixed position on said tool body.

8. An electrical connector application tool as set forth in claim 7 wherein said one wire insulation stripper comprises an aperture extending through said tool body and a blade mounted in a fixed position on said tool body and having an edge disposed within said aperture.

9. An electrical connector application tool as set forth in claim 8 wherein the distance from said edge to an associated wall of said aperture is substantially equal to the thickness of the insulation to be stripped.

10. An electrical connector application tool as set forth in claim 8 wherein said aperture comprises a generally cylindrical aperture.

11. An electrical connector application tool as set forth in 8 wherein said aperture comprises a parti-cylindrical aperture extending axially through said tool body and opening radially outwardly through said tool body.

12. An electrical connector application tool as set forth in claim 7 wherein said one wire insulation stripper comprises a pair of blades mounted in fixed position on said tool body and having opposing edges disposed within a slot in said tool body and having end portions defining a throat opening through said tool body.

13. An electrical connector application tool as set forth in claim 12 wherein said edges comprise spaced apart parallel edges.

14. An electrical connector application tool as set forth in claim 7 wherein said one wire insulation stripper includes at least one blade mounted in fixed position on said tool body and having an edge spaced from an associated surface of said tool body a distance substantially equal to the thickness of the insulation to be stripped from an associated wire.

15. An electrical connector application tool as set forth in claim 1 wherein said tool body has a groove means therein communicating with said first recess and opening through said forwardly facing wall and said outer surface for receiving an electrical cable associated with the connector assembly.

* * * * *